(12) United States Patent
Kawai (10) Patent No.: US 9,047,924 B1
(45) Date of Patent: Jun. 2, 2015

(54) MAGNETIC DISK DEVICE AND METHOD OF DATA REFRESH PROCESSING

(71) Applicant: Kabushiki Kaisha Toshiba, Minato-ku, Tokyo (JP)

(72) Inventor: Yasumasa Kawai, Kanagawa (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/456,542

(22) Filed: Aug. 11, 2014

Related U.S. Application Data

(60) Provisional application No. 62/002,551, filed on May 23, 2014.

(51) Int. Cl.
*G11B 27/36* (2006.01)

(52) U.S. Cl.
CPC ..................................... *G11B 27/36* (2013.01)

(58) Field of Classification Search
CPC .... G11B 5/012; G11B 2220/20; G11B 27/36; G11B 5/59627; G11B 5/5534; G11B 21/06; G11B 5/5547; G11B 21/083

USPC ......... 360/31, 60, 77.04, 77.02, 77.08, 78.04, 360/55
See application file for complete search history.

(56) References Cited

U.S. PATENT DOCUMENTS

| | | | |
|---|---|---|---|
| 7,245,447 B2 | 7/2007 | Zaitsu | |
| 7,570,445 B2 * | 8/2009 | Alfred et al. | 360/31 |
| 2007/0242386 A1 * | 10/2007 | Finamore et al. | 360/75 |
| 2010/0188767 A1 * | 7/2010 | Hirose et al. | 360/31 |

FOREIGN PATENT DOCUMENTS

JP 2010-238315 A 10/2010

* cited by examiner

*Primary Examiner* — Nabil Hindi
(74) *Attorney, Agent, or Firm* — White & Case LLP (57) ABSTRACT

A magnetic disk device according to an embodiment is provided with a magnetic disk including a recording surface with a plurality of tracks on which data is recorded, a head configured to write the data to the recording surface, and a controller configured to count a write count corresponding to a number of writes by the head, and to perform data refresh when the write count exceeds a threshold. While counting the write count, the controller counts using a first count-up value when the head performs an on-track write, and counts using a second count-up value higher than the first count-up value when the head performs an off-track write.

14 Claims, 8 Drawing Sheets

FIG. 1

| Track group | Write count | Data refresh threshold |
|---|---|---|
| 1 | C1 | Nth1 |
| 2 | C2 | Nth2 |
| 3 | C3 | Nth3 |
| 4 | C4 | Nth4 |
| ⋮ | ⋮ | ⋮ |

F I G. 2

F I G. 3

F I G. 4

F I G. 5

| Track group | Write count | Initial threshold for data refresh | Updated threshold for data refresh |
|---|---|---|---|
| 1 | C1 | Nth1_0 | Nth1 |
| 2 | C2 | Nth2_0 | Nth2 |
| 3 | C3 | Nth3_0 | Nth3 |
| 4 | C4 | Nth4_0 | Nth4 |
| ... | ... | ... | ... |

MAGNETIC DISK DEVICE AND METHOD OF DATA REFRESH PROCESSING

CROSS-REFERENCE TO RELATED APPLICATIONS

This application claims the benefit of U.S. Provisional Application No. 62/002,551, filed May 23, 2014, the entire contents of which are incorporated herein by reference.

FIELD

Embodiments described herein relate generally to a magnetic disk device and a data refresh method.

BACKGROUND

There is a demand for increasing the capacity of a storage device for storing data, represented by a magnetic disk device. To meet this demand, the storage density (track density and bit density) of a disk medium is being more and more increased.

In such storage devices, when data has repeatedly been written to a target track as a write target (hereinafter, referred to simply as a target track), a phenomenon (erase phenomenon) occurs, in which data on tracks near the target track will be erased due to, for example, the leakage flux of a head. Because of this phenomenon, if a data write to a particular track (or sector) is repeated, data of adjacent and neighborhood tracks to the particular track will be erased. To avoid this, when the number of data writes to a certain recording area (i.e., a write count) exceeds a predetermined value, processing for rewriting data (i.e., data refresh) is performed. A threshold associated with the write count for data refresh may be beforehand determined for each recording area in a manufacturing process. To overcome the phenomenon that adjacent track data is erased due to an off-track write, there is another known technique of prohibiting writing when the off-track write is exceeded predetermined positioning accuracy (off-track amount) during writing.

DETAILED DESCRIPTION

In general, according to one embodiment, a magnetic disk device is provided with a magnetic disk including a recording surface with a plurality of tracks on which data is recorded, a head configured to write the data to the recording surface; and a controller configured to count a write count corresponding to a number of writes by the head, and to perform data refresh when the write count exceeds a threshold. While counting the write count, the controller counts using a first count-up value when the head performs an on-track write, and counts using a second count-up value higher than the first count-up value when the head performs an off-track write.

Embodiments will be described with reference to the accompanying drawings.

Figure 1:
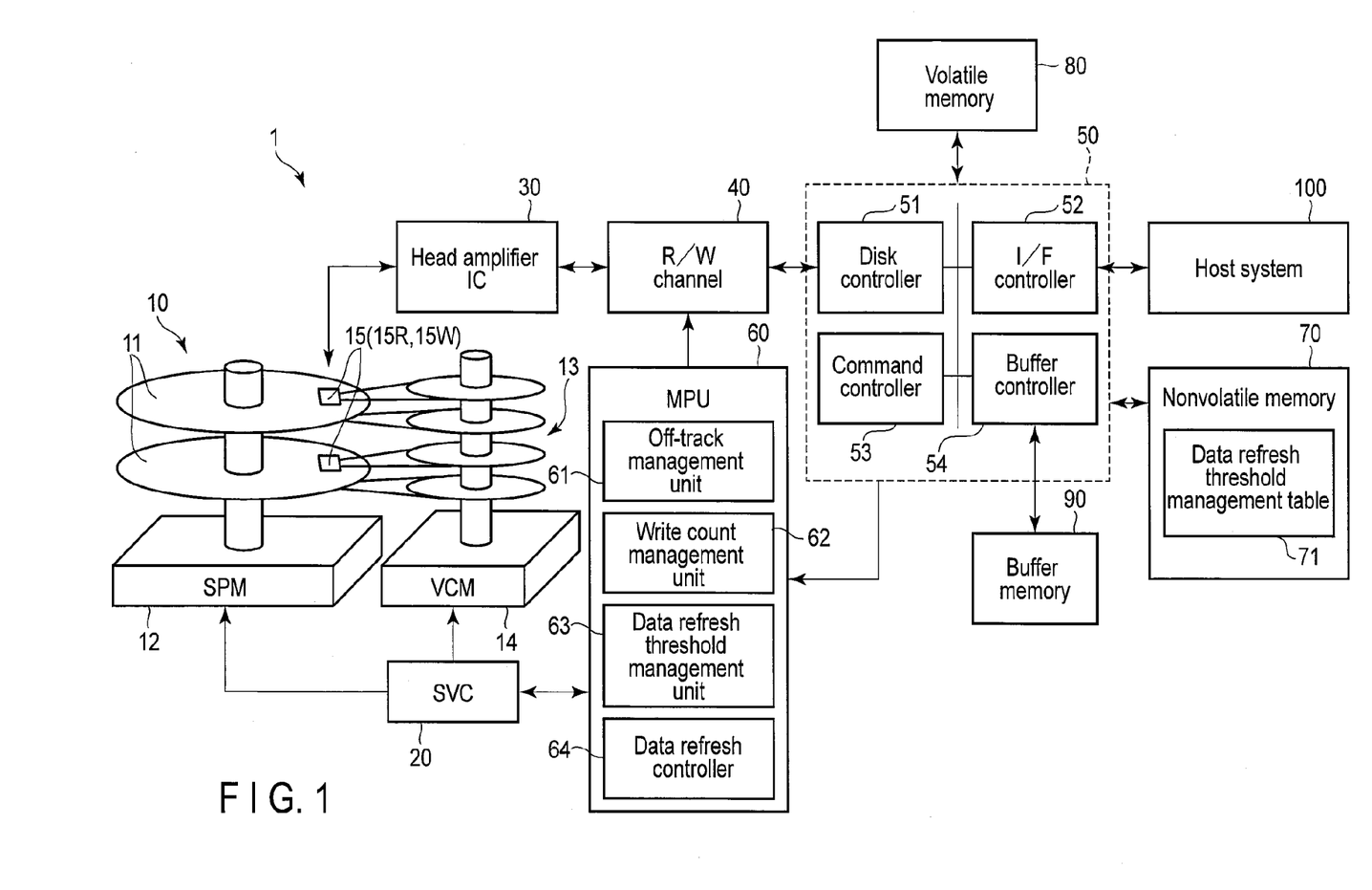
FIG. 1 is a schematic view showing a magnetic disk device according to a first embodiment.

FIG. 1 schematically shows a magnetic disk device according to a first embodiment.

As shown in FIG. 1, the magnetic disk device 1 comprises a head disk assembly (HDA) 10, a servo combo (SVC) 20, a head amplifier integrated circuit (IC) 30, a read/write (R/W) channel 40, a hard disk controller (HDC) 50 and a microprocessor (MPU) 60. The magnetic disk device 1 also comprises a volatile memory 80, a nonvolatile memory 70 and a buffer memory 90. The magnetic disk device 1 is connected to a host system (Host) 100.

The HDA 10 comprises magnetic disks 11, a spindle motor (SPM) 12 and an actuator 13. The actuator 13 comprises a voice coil motor (VCM) 14, and heads 15 mounted on an arm extending from the VCM 14. The actuator 13 controls movement of each head 15 on the magnetic disk 11 when it is driven by the VCM 14. Namely, the actuator 13 moves each head 15 to a designated position on the magnetic disk 11 by drive of the VCM 14.

Each head 15 has a slider as a main body, and a write head (writer) 15W and a read head (reader) 15R attached to the slider. Each head 15 moves in a radial direction perpendicular to a track as a write or read target. The write head 15W writes data to the magnetic disk 11. The read head 15R reads data from the magnetic disk 11.

The SVC 20 drives the SPM 12 and the VCM 14 under the control of the MPU 60. The VCM 14 is driven by the SVC 20, and each head 15 is driven by the VCM 14 to move to a designated position on the magnetic disk 11.

The head amplifier IC 30 has a preamplifier and a write driver. The preamplifier amplifies a read signal read by the read head 15R, and sends the resultant signal as a read data signal to the read/write (R/W) channel 40. The write driver sends to the write head 15W a write current corresponding to the write data output from the R/W channel 40.

The R/W channel 40 includes a read channel configured to perform read data signal processing, and a write channel configured to perform write data signal processing.

The HDC 50 comprises a disk controller 51, an I/F controller 52, a command controller 53 and a buffer controller 54.

The disk controller 51 is connected to the R/W channel 40, and configured to perform processing of reading and writing data to and from the magnetic disk 11.

The I/F controller 52 controls data transfer between the host 100 and the R/W channel 40.

The command controller 53 performs control associated with a write or read command received from the host system 100.

The buffer controller 54 is connected to the buffer memory 90 to perform control associated with data transmitted to and from the buffer memory 90. The buffer controller 54 temporarily stores, in the buffer memory 90, data read from the magnetic disk 11, data to be written to the magnetic disk 11 in accordance with a write command, etc.

The MPU (controller) 60 is a main controller in the magnetic disk device 1, and is configured to control the VCM 14 to perform, for example, servo control for positioning each head 15.

The R/W channel 40, the HDC 50 and the MPU 60 may be each formed of a one-chip integrated circuit.

The MPU 60 comprises an off-track management unit (first management unit) 61, a write count management unit (second management unit) 62, a data refresh threshold management unit (third management unit) 63 and a data refresh controller 64. The processing performed by the off-track management unit 61, the write count management unit 62, the data refresh threshold management unit 63 and the data refresh controller 64 can be realized by firmware (programs).

The off-track management unit 61 manages the write (off-track write) state of each head 15. More specifically, the off-track management unit 61 detects an off-track write of each head 15, and acquires and manages data associated with the detected off-track write. For instance, the off-track management unit 61 detects, for example, the positioning accuracy (off-track amount) of each head 15, and the position of a track group in which an off-track write was performed, and manages the detected data. The "track group" is a management unit that includes a plurality of tracks, and can be set to a desired value on the program. Based on the detection results, the off-track management unit 61 determines whether the predetermined off-track amount (off-track write determination value) is exceeded, thereby determining occurrence of an off-track write. The off-track write determination value can be set to a desired value on the program. The data associated with off-track writes and acquired by the off-track management unit 61 is stored in the nonvolatile memory 70 and the volatile memory 80. The data associated with off-track writes is, for example, the aforementioned off-track amount, the number of off-track writes, the position of the track group in which an off-track write was made. Further, when an off-track write has occurred, the off-track management unit 61 performs control for returning an off-tracked head 15 to an on-track state.

The write count management unit 62 manages, for each track group, the number of writes (more specifically, a write count based on the number of writes) to a particular area (e.g., a certain track group). The write count indicates the number of writes to a sector (sectors) or a track (tracks) included in a track group. The write count management unit 62 refers to data associated with the off-track write(s) detected by the off-track management unit 61, thereby determining the write count. The write count management unit 62 stores and manages, in the nonvolatile memory 70 and the volatile memory 80, the counting result indicating the write count in association with, for example, the position data of a target track. The write count may be recorded as a count associated with a target track and corresponding to a radial direction of the magnetic disk 11. Namely, the write count management unit 62 may determine whether the off-track direction is radially inward or outward, count write counts for respective track groups, and manage them.

Further, in order to quickly execute data refresh upon occurrence of an off-track, the write count management unit 62 increases a count-up value (addition value) for a write count, compared to the case of on-track writes. For instance, when counting an off-track write count, the write count management unit 62 uses a greater count-up value than in the case of a preset on-track write. Thus, when the off-track management unit 61 has detected occurrence of an off-track write, the write count management unit 62 counts using a greater count-up value than that added to a write count before the occurrence of the off-track write.

In the first embodiment, it is assumed that in the write count management unit 62, some count-up values corresponding to situations are preset for each track group. For instance, the write count management unit 62 sets different write count-up values between off-track writing and on-track writing. It is also assumed that the write count-up value for off-track writing is greater than that for on-track writing. In the description below, the value added to the write count at on-track writing will be referred to as an on-track write count-up value (first count-up value), and the value added to the write count at off-track writing will be referred to as an off-track write count-up value (second count-up value). For instance, when the head performs an on-track write, the write count management unit 62 counts a write count using the on-track count-up value. Similarly, when the head performs an off-track write, the write count management unit 62 counts a write count using the off-track count-up value. The on-track count-up value and the off-track count-up value may be fixed values. For instance, the on-track count-up value is 1, and the off-track count-up value is 200. The on-track and off-track count-up values are stored in the nonvolatile memory 70 and the volatile memory 80, and are referred to by the write count management unit 62 in accordance with processing.

The write count management unit 62 may count a write count using the off-track count-up value, whenever an off-track write occurs. Alternatively, when the number of off-track writes exceeds a threshold, e.g., when off-track writing occurred a plurality of times, the number of writes (write count) may be counted using the off-track count-up value.

Further, the on-track and off-track count-up values are not limited to fixed values, but may be set as variables. The write count management unit 62 may weight the off-track write count-up value in accordance with an off-track amount associated with a target track. For instance, when an off-track write has occurred in a track group, the write count management unit 62 may perform processing of incrementing the off-track write count-up value for the track group in units of 10 in accordance with the off-track amount associated with the target track.

The data refresh threshold management unit 63 manages write count thresholds (data refresh thresholds) for performing data refresh for respective track groups. In the first embodiment, the data refresh threshold may be set to fixed values beforehand determined for respective track groups in the manufacturing process. The data refresh threshold management unit 63 stores, for managing, data refresh thresholds for respective track groups in the nonvolatile memory 70 and the volatile memory 80. The data refresh threshold management unit 63 updates, when necessary, the data refresh thresholds stored in the nonvolatile memory 70 or the volatile memory 80. The data refresh thresholds may be recorded as values corresponding to directions parallel to the radial direction and relative to the target track. Namely, the data refresh threshold management unit 63 may manage the data refresh thresholds, depending upon a result of determination as to whether the off-set direction is the radially inward or outward direction relative to the target track.

When the write count of any track group has reached its data refresh threshold, the data refresh threshold management unit 63 instructs the data refresh controller 64 to execute data refresh.

The data refresh controller 64 performs control associated with data refresh. The data refresh controller 64 executes data refresh in accordance with an instruction from the data refresh threshold management unit 63.

The nonvolatile memory 70 is, for example, a rewritable flash memory, and stores programs and parameters necessary for the operations of the MPU 60. The nonvolatile memory 70 stores a data refresh threshold management table (threshold management table) 71. Namely, the nonvolatile memory 70 holds data refresh thresholds and write counts corresponding to the respective track groups in the threshold management table 71. The nonvolatile memory 70 also holds on-track count-up values and off-track count-up values applied when write counts are counted. The threshold management table 71 is managed by the data refresh threshold management unit 63 incorporated in the MPU 60. Namely, the threshold management table 71 is loaded from the nonvolatile memory 70 to the volatile memory 80 and updated by firmware executed by the MPU 60.

Figure 2:
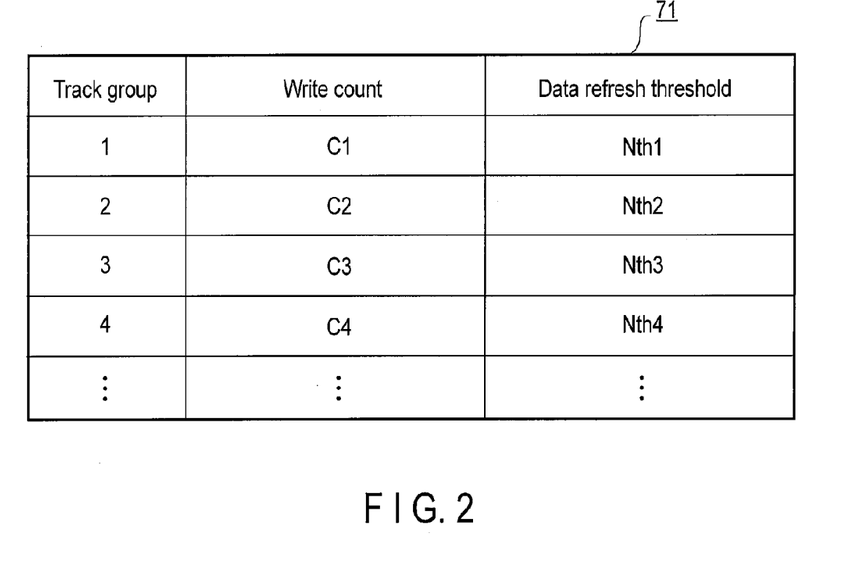
FIG. 2 shows part of a threshold management table according to the first embodiment.

FIG. 2 shows part of the threshold management table 71 according to the first embodiment. As described above, the data refresh threshold management table 71 stores and manages write counts, data refresh thresholds, etc. in association with the respective track groups. In FIG. 2, the track groups are indicated by group numbers (1, 2, 3, 4), and the write counts are indicated by C1, C2, C3 and C4 corresponding to the group numbers. The data refresh thresholds are thresholds associated with write counts and set for the respective track groups to execute data refresh. The data refresh thresholds are provided for the respective track groups and referred to by the MPU 60. The data refresh thresholds are predetermined fixed values set for the respective track groups on the program. Only a single data refresh threshold may be set for each of the track groups. Alternatively, different data refresh thresholds may be provided for the respective track groups, or values obtained by weighting thresholds in the directions parallel to the radial direction of the magnetic disk 11 be set for the respective track groups. In FIG. 2, the data refresh thresholds are indicated by Nth1, Nth2, Nth3 and Nth4 set for the respective track groups. When an off-track write has occurred, the MPU 60 refers to, for example, the data refresh thresholds Nth1, Nth2, Nth3 and Nth4. The volatile memory 80 temporarily stores data necessary for the operations of the MPU 60. For instance, the volatile memory 80 is a random access memory (RAM), and is configured to load control programs (firmware including control data), write counts and the threshold management table 71. The volatile memory 80 may temporarily store the data refresh thresholds and write counts corresponding to the respective track groups.

The buffer memory 90 is connected to the buffer controller 54. The buffer memory 90 stores data sent from the buffer controller 54, and sends data stored therein to the buffer controller 54 in accordance with a control instruction from the buffer controller 54. The buffer memory 90 may be provided in the volatile memory 80.

The host system 100 is an interface controller of, for example, Serial ATA (SATA) or Serial attached SCSI (SAS).

Advantage of the Data Refresh Processing Method According to the First Embodiment Referring to FIGS. 3 and 4, a description will be given of an advantage associated with the data refresh processing method of the first embodiment.

Figure 3:
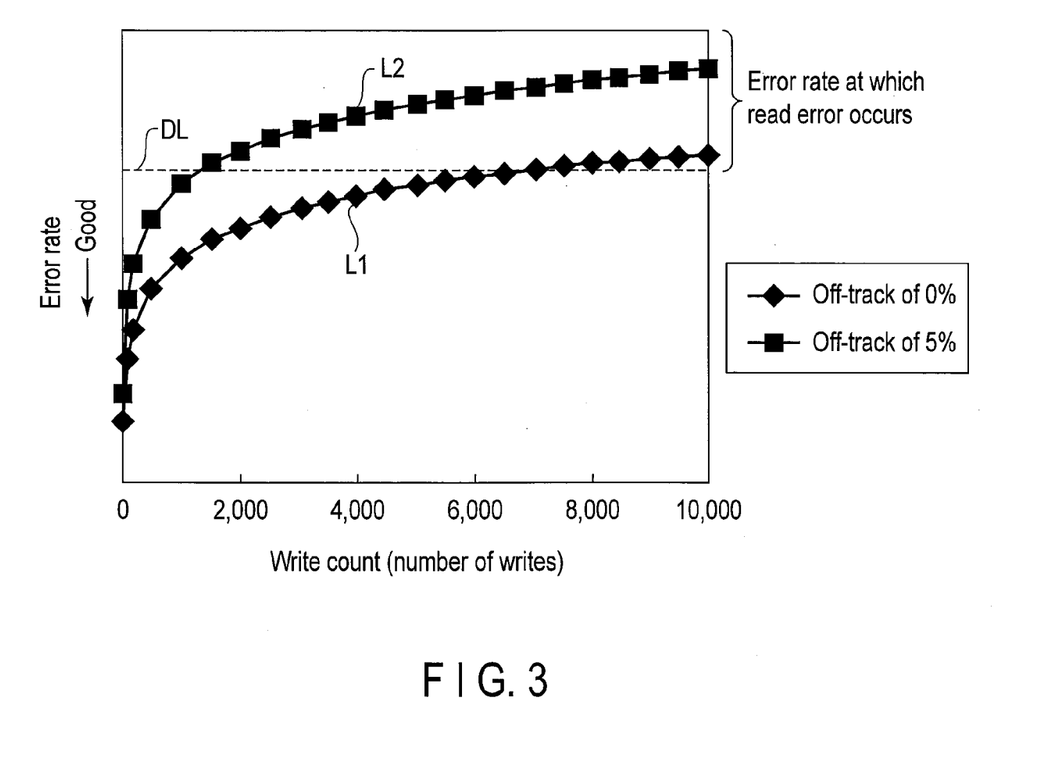
FIG. 3 is a graph showing an example of a relationship between the number of repeated writes and the error rate.

FIG. 3 is a graph showing an example of a relationship between the number of repeated writes and the error rate. In FIG. 3, the horizontal axis indicates the number of repeated writes (write count), and the vertical axis indicates the error rate. Part of the data on adjacent and neighboring tracks around a predetermined sector will be erased when repeated data writes and an off-track write are made to the sector. If data reading is made on a track from which part of data is erased, the error rate will increase (e.g., the data reading will be degraded). If a predetermined error rate is exceeded, a read error will occur when a data read is made using the read head 15R. In FIG. 3, the broken line DL indicates the error rate threshold above which a read error will occur. Curve L1 indicates a case where the occurrence rate of off-track write is 0%, i.e., indicates changes in error rate assumed when writes were all on-track writes. Curve L2 indicates changes in error rate assumed when the occurrence rate of off-track writes was 5%. In the case indicated by curve L1, a greater number of writes was made before the broken line DL, compared to the case indicated by curve L2. This means that the broken line DL is reached by a smaller number of repeated writes in the case where off-track writes occurred, than in the case where no off-track writes occurred. Namely, as the off-track write occurrence rate becomes higher, the repeated write count threshold, above which a read error will occur, is reached earlier.

Figure 4:
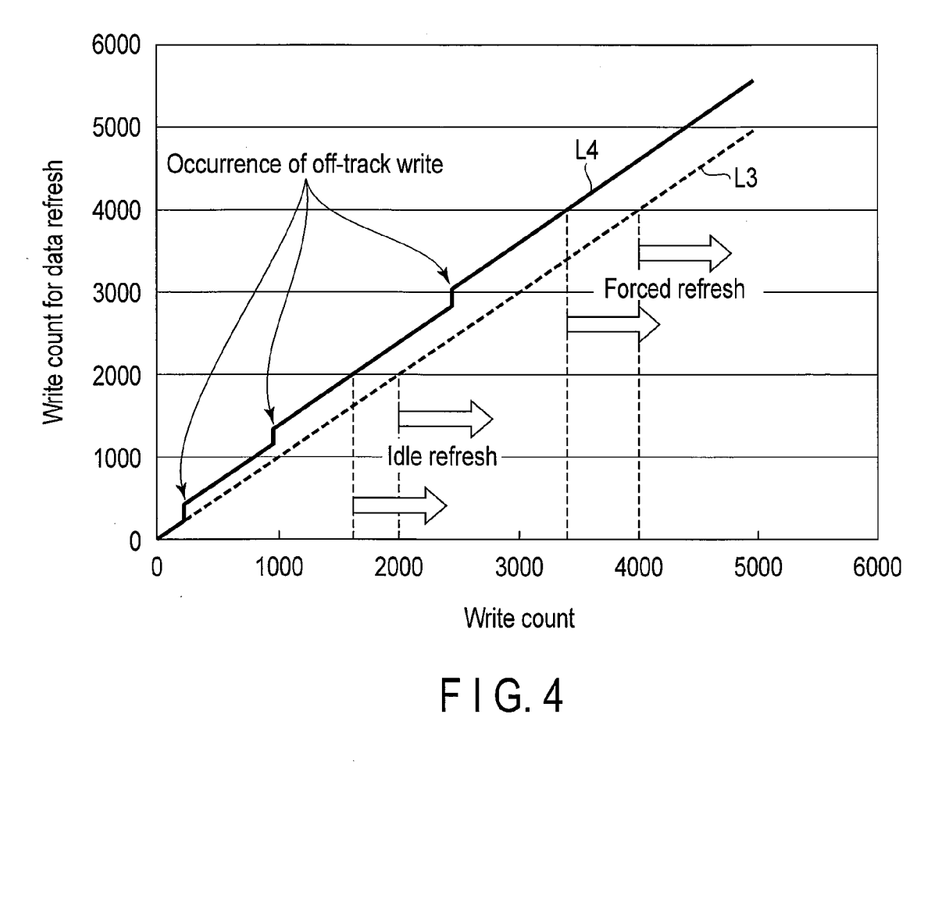
FIG. 4 is a graph showing an example of a relationship between a track write count and a write count for data refresh, according to the first embodiment.

FIG. 4 is a graph showing an example of a relationship between the number of actual writes to track groups and the write count for data refresh. In FIG. 4, the horizontal axis indicates the number of actual writes (actual write count), and the vertical axis indicates the weighted write count for executing data refresh early.

In FIG. 4, L3 indicates changes in the on-track write count (first data refresh write count). L3 indicates that since no off-track occurred, the actual write count changes at the same rate as the write count for data refresh. In other words, in the case indicated by L3, both the actual write count and the write count for data refresh change continuously.

In contrast, L4 indicates changes in a write count (second data refresh write count) assumed when off-track writes occurred during writing. It can be understood from L4 that whenever an off-track write occurs, a difference occurs between the actual write count and the write count for data refresh. Namely, in the case indicated by L4, the actual write count and the write count for data refresh are not always proportional. L4 indicates that the write count for data refresh is set greater than the actual write count whenever an off-track write occurs. For instance, the write count management unit 62 manages the write count to add 200 thereto whenever an off-track write occurs.

In FIG. 4, "Idle refresh" indicates data refresh in an idle mode, while "Forced refresh" indicates data refresh in a forced mode. The idle mode means a standby mode where processing corresponding to a command from the host system 100 has completed, and a subsequent command is waited for. Further, the forced mode means a mode where data refresh is performed subsequent to the processing corresponding to a write command. It is assumed that idle refresh is performed when the write count reaches 2000, and the forced refresh is performed when the write count reaches 4000. In the case of L3, idle refresh is performed where the actual write count and the write count for data refresh are both 2000, and force refresh is performed where the actual write count and the write count for data refresh are both 4000. In contrast, in the case of L4, idle refresh is performed where the actual write count falls within a range of from 1000 or more to not more 2000, which corresponds to a write count of 2000. Further, force refresh is performed where the actual write count falls within a range of from 3000 or more to not more 4000, which corresponds to a write count of 4000.

Thus, in the first embodiment, when occurrence of an off-track write has been detected, the write count used for performing data refresh is weighted, with the result that data written to a track (or sector) can be refreshed before an error rate threshold, at which a read error will occur.

Figure 5:
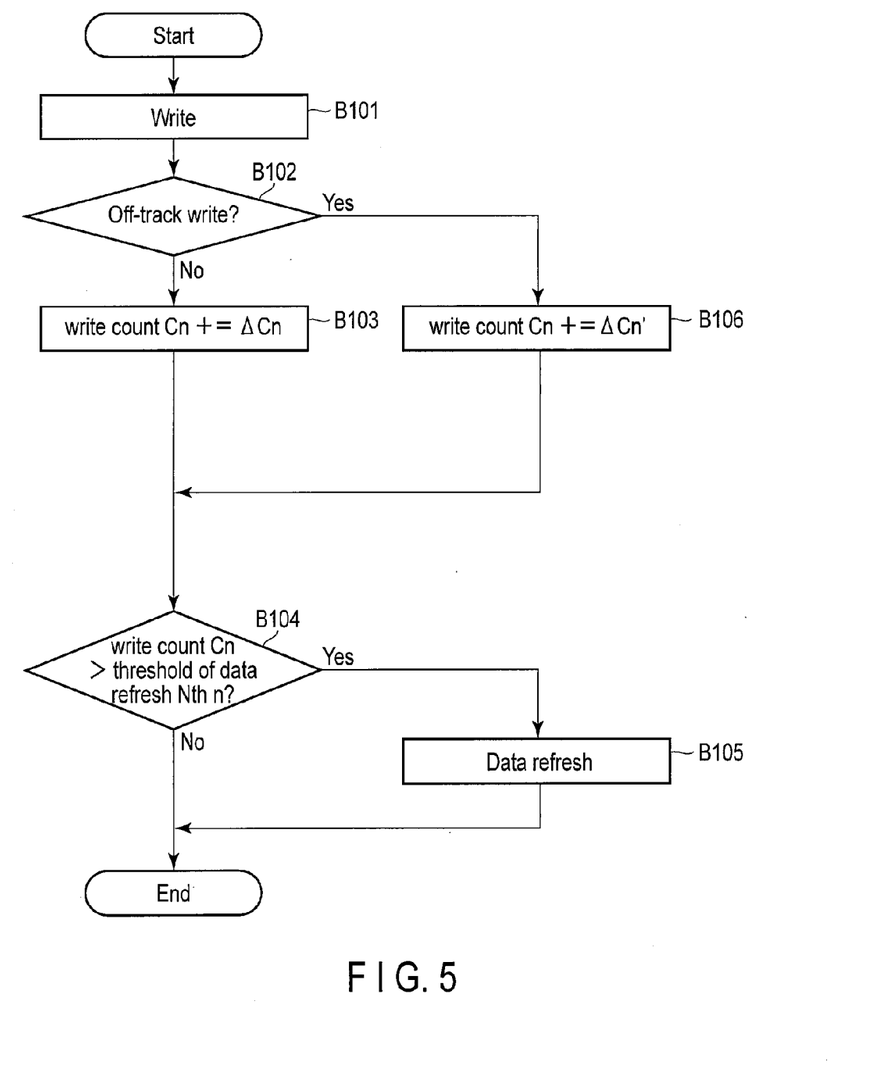
FIG. 5 is a flowchart for data refresh processing according to the first embodiment.

Referring then to FIG. 5, data refresh processing in the first embodiment will be described.

FIG. 5 is a flowchart for data refresh processing.

Firstly, the write head 15W is moved to a target track on the magnetic disk 11 by the operation of the VCM 14, whereby data is written to the target track (B101). While the data write is performed, the MPU 60 (more specifically, the off-track management unit 61) monitors occurrence of an off-track write and determines whether it has occurred (B102). If it is determined that no off-track write has occurred (No in B102), an on-track write count-up value ΔCn is added to a write count Cn corresponding to a track group n including the track to which data has been written (B103). The on-track write count-up value ΔCn is, for example, 1. Subsequently, the MPU 60 determines whether the write count Cn exceeds the data refresh threshold (B104). If it determines that the write count Cn exceeds the data refresh threshold (Yes in B104), the data written to the track in the track group is refreshed (B105), which is the termination of this processing. If it determines that the write count Cn does not exceed the data refresh threshold (No in B104), the processing is finished without performing data refresh.

In contrast, if it is determined that an off-track write has occurred (Yes in B102), an off-track write count-up value ΔCn' is added to the write count Cn corresponding to a track group n including the track in which the off-track write has occurred (B106). The off-track write count-up value ΔCn' is greater than the on-track write count-up value ΔCn. For instance, the off-track write count-up value ΔCn' is 200. After that, the program proceeds to B104, thereby performing processing in B104 et seq.

As described above, in the first embodiment, when the CPU 60 has detected occurrence of an off-track write during a data write to a track, it adds, to a write count for data refresh, a greater value than in an on-track write (i.e., a data write with no off-track write). By thus adding an off-track write count-up value when occurrence of an off-track write has been detected, the write count for performing data refresh at the time of occurrence of an off-track write reaches the data refresh threshold earlier than the write count at the time of on-track writes.

Second Embodiment

In the above-described first embodiment, when an off-track write has occurred, the write count for data refresh is increased greatly, thereby enabling the write count to reach the data refresh threshold earlier. In a second embodiment, a description will be given of processing for enabling the write count to reach the data refresh threshold earlier by lowering the data refresh threshold instead of changing an addition value to be added to the write count.

A magnetic disk device 1 according to the second embodiment has substantially the same configuration as that of the first embodiment. Therefore, elements similar to those of the first embodiment are denoted by corresponding reference numbers, and no detailed description will be given thereof.

In the first embodiment, the data refresh threshold is set as a fixed value. In contrast, in the second embodiment, the data refresh threshold management unit 63 updates (changes) the data refresh threshold. More specifically, the data refresh threshold management unit 63 receives data associated with an off-track write from the off-track management unit 61, and reduces the data refresh threshold in order to perform data refresh earlier, whenever an off-track write occurs. In the nonvolatile memory 70 and the volatile memory 80, the data refresh threshold management unit 63 records the resultant data refresh thresholds corresponding to the respective track groups in the form of a threshold management table 71. If, for example, an off-track write of a predetermined off-track amount (level) (off-track determination value) has occurred, the data refresh threshold may be reduced using other conditions. Alternatively, the data refresh threshold management unit 63 may reduce the data refresh threshold when the level of the off-track write exceeds the off-track determination value.

The nonvolatile memory 70 has the above-mentioned threshold management table 71 that comprises initial data refresh thresholds (initial thresholds), write counts, and updated data refresh thresholds (updated thresholds), which correspond to the respective track groups. Although the data refresh thresholds (initial and updated thresholds) may be managed for the respective track groups, using the above-mentioned threshold management table 71 as in the first embodiment, they may be managed in association with the respective data zones or heads. The threshold management table 71 is updated by firmware loaded from the nonvolatile memory 70 to the volatile memory 80 and executed by the data refresh threshold management unit 63 (MPU 60).

The volatile memory 80 loads the threshold management table 71 to temporarily store the write counts and data refresh thresholds corresponding to the respective tracks.

Figure 6:
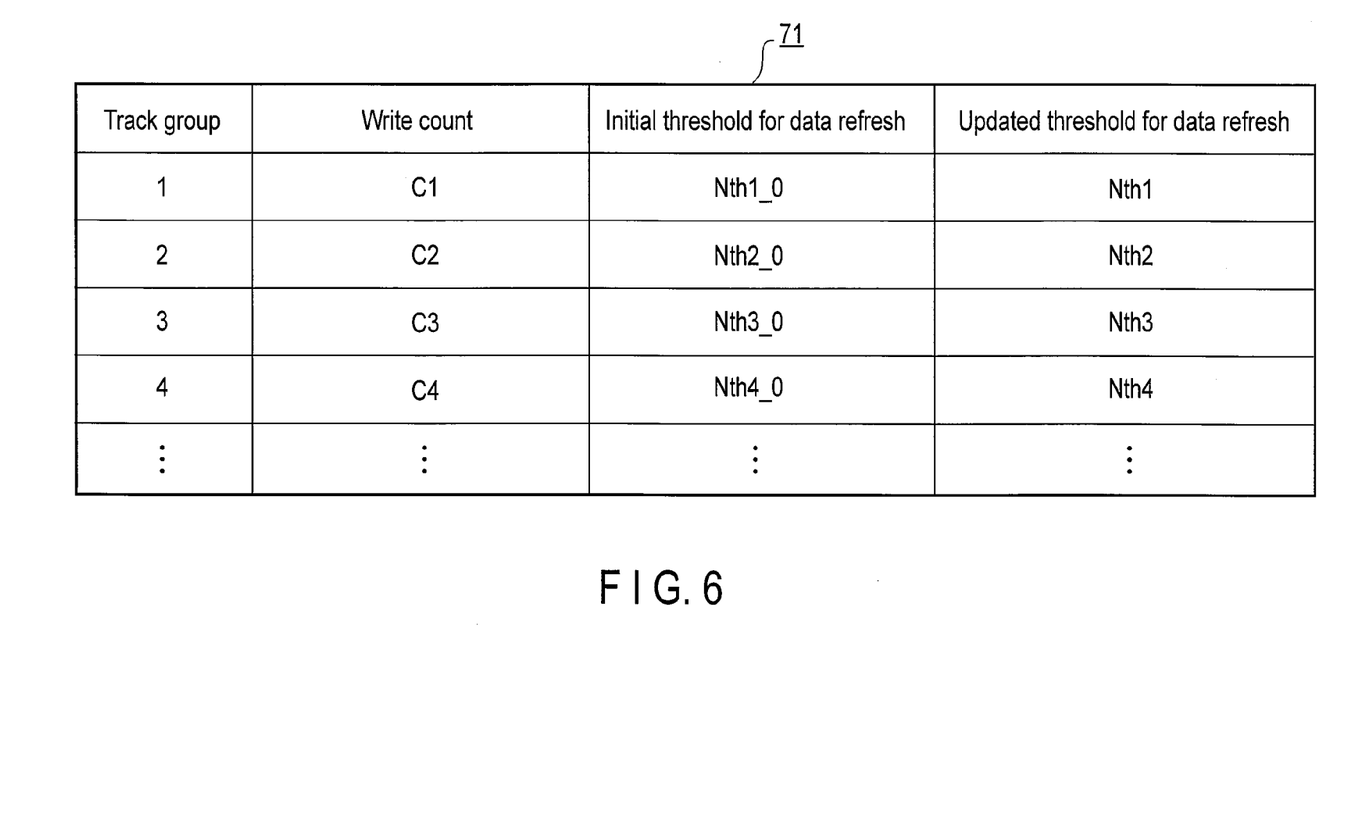
FIG. 6 shows part of a threshold management table according to a second embodiment.

FIG. 6 shows part of the threshold management table 71 associated with the second embodiment. As aforementioned, the data refresh threshold management table 71 stores and manages the write counts, the data refresh thresholds, etc., in association with the track groups. For instance, as shown in FIG. 6, the data refresh threshold management table 71 stores write counts, initial thresholds and updated thresholds corresponding to the respective track groups.

The initial thresholds are initial values for the write count thresholds set for data refresh in association with the respective track groups. The initial thresholds are provided for the respective track groups, and are referred to as the initial values of the updated data refresh thresholds by the MPU 60. The initial thresholds are predetermined fixed values, and are arbitrarily set on the program for the respective track groups. For instance, a single initial data refresh value may be set for all track groups, or different initial data refresh values be set for them. Yet alternatively, the initial thresholds may be values obtained by performing weighting in directions parallel to the radial direction. In FIG. 6, the initial thresholds are indicated by Nth1_0, Nth2_0, Nth3_0 and Nth4_0 corresponding to the respective track groups. For instance, Nth1_0, Nth2_0, Nth3_0 and Nth4_0 are stored in the nonvolatile memory 70 and the volatile memory 80, and read therefrom when necessary.

The updated thresholds are those for the write counts set in association with the respective track groups in order to perform data refresh. The updated thresholds are updated to values lower than the respective initial thresholds so that data refresh can be performed earlier when an off-track write has occurred. The updated thresholds are repeatedly updated in accordance with the number of occurrences of off-track, and are updated to lower values as the number of updates increases. When data refresh has been performed, the updated thresholds are returned to the initial values.

As described above, when, for example, an off-track write has occurred, the MPU 60 refers to the updated thresholds as data refresh thresholds. After data refresh is performed, the MPU 60 again refers to the initial thresholds as data refresh thresholds.

In FIG. 6, the updated thresholds are indicated by Nth1, Nth2, Nth3 and Nth4. Upon occurrence of an off-track write, the MPU 60 refers to Nth1, Nth2, Nth3 and Nth4 as data refresh thresholds. Upon occurrence of an off-track write, the updated thresholds Nth1, Nth2, Nth3 and Nth4 are reduced by a predetermined value (a reduction value). For instance, if the reduction value is 1000, the data refresh threshold is recued in units of 1000 whenever an off-track write occurs. When the write count has reached the data refresh threshold, data refresh is performed.

Advantage of a Data Refresh Processing Method According to the Second Embodiment Referring to FIG. 7, a description will be given of the advantage of a data refresh processing method according to the second embodiment.

In the second embodiment, each data refresh threshold is reduced whenever the MPU 60 detects occurrence of an off-track write.

Figure 7:
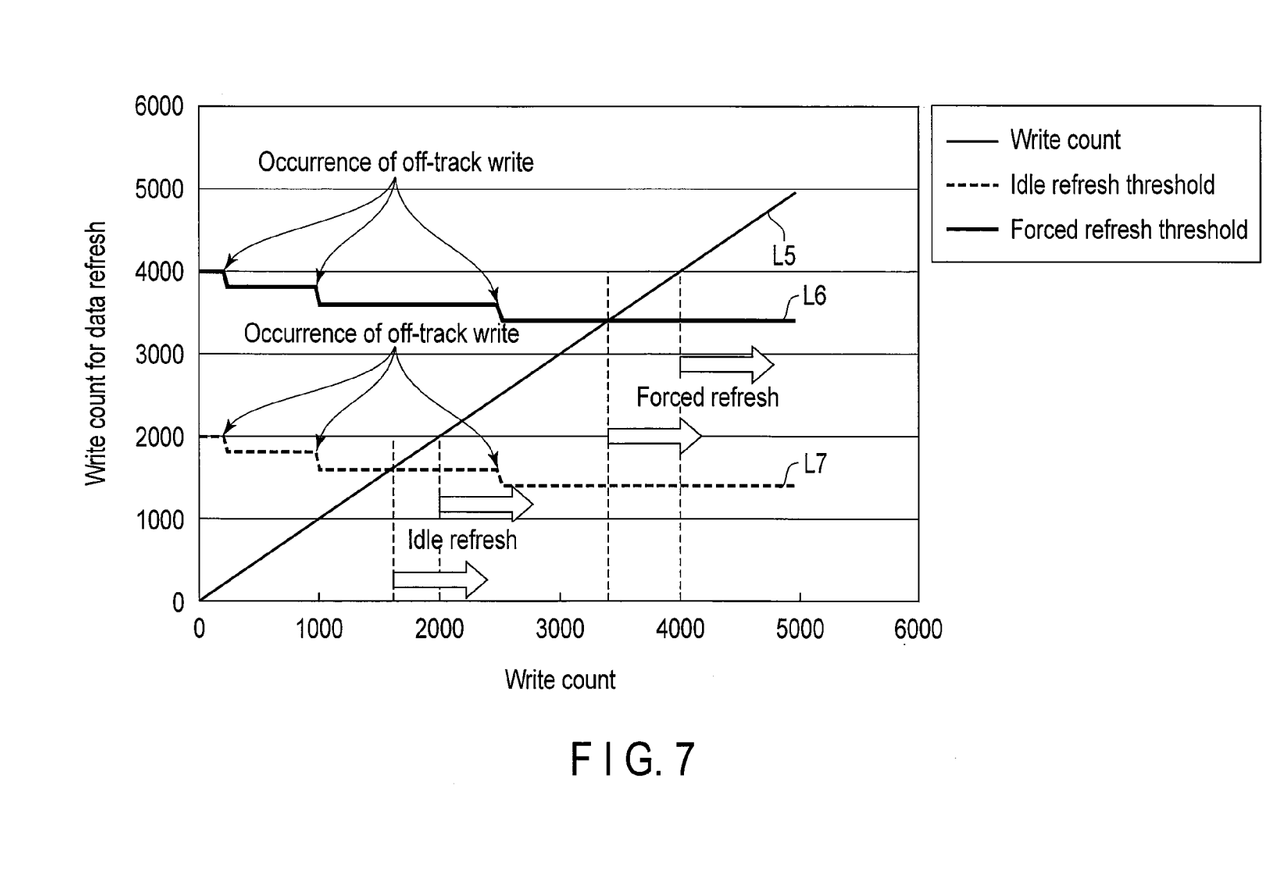
FIG. 7 is a graph showing an example of a relationship between a track write count and a write count for data refresh, according to the second embodiment.

FIG. 7 shows an example of a relationship between the actual write count and the write count for data refresh corresponding to the respective track groups. In FIG. 7, the horizontal axis indicates the actual write count and the vertical axis indicates the write count for performing data refresh.

In FIG. 7, L5 indicates changes in the write count for data refresh relative to the actual write count. More specifically, L5 indicates that the write count for data refresh changes at the same rate as the actual write count, namely, the former is in direct proportion to the latter. L6 indicates changes in the data refresh threshold (forced refresh threshold) associated with forced refresh, and L7 indicates changes in the data refresh threshold (idle refresh threshold) associated with idle refresh. The forced refresh threshold and a second data refresh threshold are reduced whenever an off-track write occurs. In FIG. 7, where L5 associated with the write count crosses each of L6 associated with the forced refresh threshold and L7 associated with the idle refresh threshold, data refresh is performed.

For instance, the initial value of the forced refresh threshold for the forced mode is set to 4000. After that, whenever an off-track write occurs, the forced refresh threshold is reduced, whereby the intersection with L5 is reduced to a count lower than the forced refresh threshold initial value of 4000. Namely, data refresh is performed earlier.

Similarly, the initial value of the idle refresh threshold for the idle mode is set to 2000. Whenever an off-track write occurs, the idle refresh threshold is reduced, whereby the intersection with L5 is reduced to a count lower than the idle refresh threshold initial value of 2000. Namely, data refresh is performed earlier.

As described above, in the second embodiment, if the MPU 60 (more specifically, the off-track management unit 61) determines that an off-track write has occurred, the data refresh threshold is updated to a lower value. Namely, before the error rate threshold DL shown in FIG. 3, at which a read error will occur, is reached, data written to a track (or sector) in a track group is subjected to data refresh.

Figure 8:
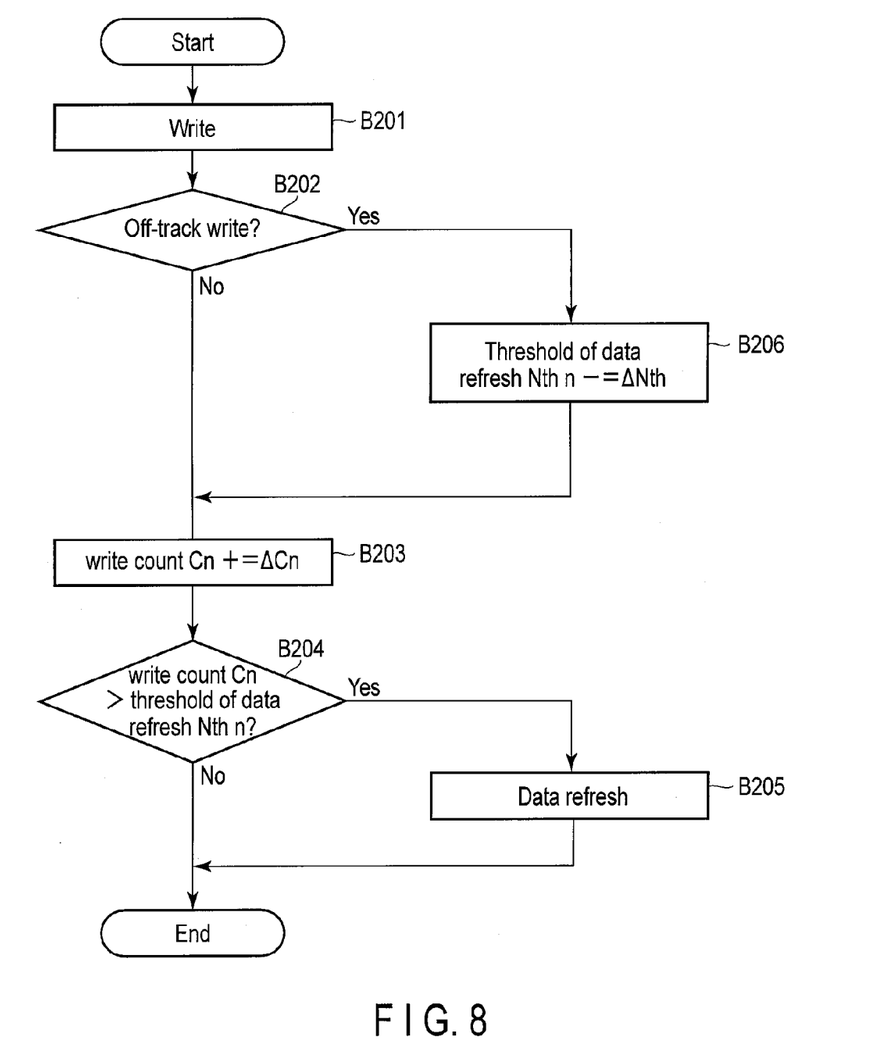
FIG. 8 is a flowchart for data refresh processing according to the second embodiment.

Referring then to FIG. 8, a description will be given of data refresh processing in the second embodiment.

FIG. 8 is a flowchart for data refresh processing according to the second embodiment.

Firstly, the write head 15W is moved to a target track on the magnetic disk 11 by the operation of the VCM 14, whereby data is written to the target track (B201). While the data write is performed, the MPU 60 (more specifically, the off-track management unit 61) monitors occurrence of an off-track write and determines whether it has occurred (B202). If it is determined that no off-track write has occurred (No in B202), an on-track write count-up value $\Delta Cn$ is added to a write count Cn corresponding to a track group n including the track to which data has been written (B203). The on-track write count-up value $\Delta Cn$ is, for example, 1. Subsequently, the MPU 60 determines whether the write count Cn exceeds the data refresh threshold (B204). If it determines that the write count Cn exceeds the data refresh threshold (Yes in B204), the data written to the track in the track group is refreshed (B205), which is the termination of this processing. If it determines that the write count Cn does not exceed the data refresh threshold (No in B204), the processing is finished without performing data refresh.

In contrast, if it is determined that an off-track write has occurred (Yes in B202), the data refresh threshold corresponding to the track group n including the track in which the off-track write has occurred is updated to an updated threshold Nthn obtained by subtracting a reduction value from the initial threshold Nthn_0 (B206). The reduction value is, for example, 1000. Subsequently, the program proceeds to step B203 to thereby perform the processing in B203 et seq.

When data refresh processing is repeated, the initial data refresh threshold in current data refresh processing is used the data threshold in the before data refresh processing. For instance, in the repeated processing, if it determines that the off-track write has occurred (Yes in B202), the data refresh threshold is updated to a further updated value obtained by subtracting a reduction value from the current data refresh threshold Nthn. This data refresh threshold update processing is repeated until data refresh is performed.

In the second embodiment, if the MPU 60 detects occurrence of an off-track write during a data write to a track, the current data refresh threshold (the initial threshold or the current updated threshold) is further reduced. Since the data refresh threshold is reduced whenever occurrence of an off-track write is detected, the write count reaches the data refresh threshold earlier than before updating.

By virtue of the above, in the second embodiment, since the write count reaches the data refresh threshold earlier, data refresh is performed before occurrence of a read error. Namely, occurrence of a read error can be suppressed.

Although in the second embodiment, the write counts and the data refresh thresholds are managed in association with respective track groups, they may be managed in association with respective sector groups each including a certain number of sectors. In this case, data refresh thresholds are set for the respective sector groups. For instance, when an off-track write has been made to a sector group around a target sector group during a write to the target sector group, the write count to the sector group, to which the off-track write has been made, is increased. At this time, the data refresh threshold and the write count for data refresh associated with the sector group, to which the off-track write has been made, are updated. By managing write counts in association with the respective sector groups, processing associated with the off-track write can be accurately managed.

Further, the write count and the data refresh threshold may be managed in association with respective tracks. For instance, when an off-track write has been made to a track near a target track during a write to the target track, the write count associated with the track, to which the off-track write has been made, is increased. At this time, the data refresh threshold and the write count for data refresh associated with the track, to which the off-track write has been made, are updated. By managing the write counts in association with the respective tracks, processing associated with the off-track write can be accurately managed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk including a recording surface with a plurality of tracks on which data is recorded;
a head configured to write the data to the recording surface; and
a controller configured to count a write count corresponding to a number of writes by the head, and to perform data refresh when the write count exceeds a threshold,
wherein while counting the write count, the controller counts using a first count-up value when the head performs an on-track write, and counts using a second count-up value higher than the first count-up value when the head performs an off-track write.

2. The magnetic disk device of claim 1, wherein the controller determines whether the off-track write occurs inwardly or outwardly on the magnetic disk with respect to a target track, and counts based on a determination result, using the first or second count-up value.

3. The magnetic disk device of claim 1, wherein the controller manages write counts in association with respective track groups each including a plurality of tracks.

4. The magnetic disk device of claim 1, wherein the controller increases the second count-up value in accordance with an off-track amount of the off-track write.

5. A magnetic disk device comprising:
a magnetic disk including a recording surface with a plurality of tracks on which data is recorded;
a head configured to write the data to the recording surface; and
a controller configured to count a write count corresponding to a number of writes by the head, and to perform data refresh when the write count exceeds a threshold,
wherein the controller reduces the threshold in accordance with whether an off-track write occurs inwardly or outwardly on the magnetic disk with respect to a target track.

6. The magnetic disk device of claim 5, wherein the controller manages thresholds in association with respective track groups each including a plurality of tracks.

7. The magnetic disk device of claim 5, wherein the controller reduces the threshold in accordance with an off-track amount of the off-track write.

8. A data refresh method for use in a magnetic disk device including a magnetic disk having a recording surface with a plurality of tracks on which data is recorded, and a head configured to write the data to the recording surface, the method comprising:
counting a write count corresponding to a number of writes by the head;
performing data refresh when the write count exceeds a threshold; and
while counting the write count, counting using a first count-up value when the head performs an on-track write, and counting using a second count-up value higher than the first count-up value when the head performs an off-track write, or reducing the threshold in accordance with whether the off-track write occurs inwardly or outwardly on the magnetic disk with respect to a target track.

9. The method of claim 8, further comprising determining whether the off-track write occurs inwardly or outwardly on the magnetic disk with respect to a target track, and counting based on a determination result, using the first or second count-up value.

10. The method of claim 8, further comprising managing write counts in association with respective track groups each including a plurality of tracks.

11. The method of claim 8, further comprising managing thresholds in association with respective track groups each including a plurality of tracks.

12. The method of claim 8, further comprising increasing the second count-up value in accordance with an off-track amount of the off-track write.

13. The method of claim 8, further comprising reducing the threshold in accordance with an off-track amount of the off-track write.

14. The magnetic disk device of claim 1, wherein the controller counts using the first or second count-up value in accordance with whether the off-track write occurs inwardly or outwardly on the magnetic disk with respect to a target track.

* * * * *